Dec. 25, 1923.
A. S. OLDHAM
METHOD OF MAKING COFFEE
Filed Sept. 7, 1922
1,478,908
2 Sheets-Sheet 1
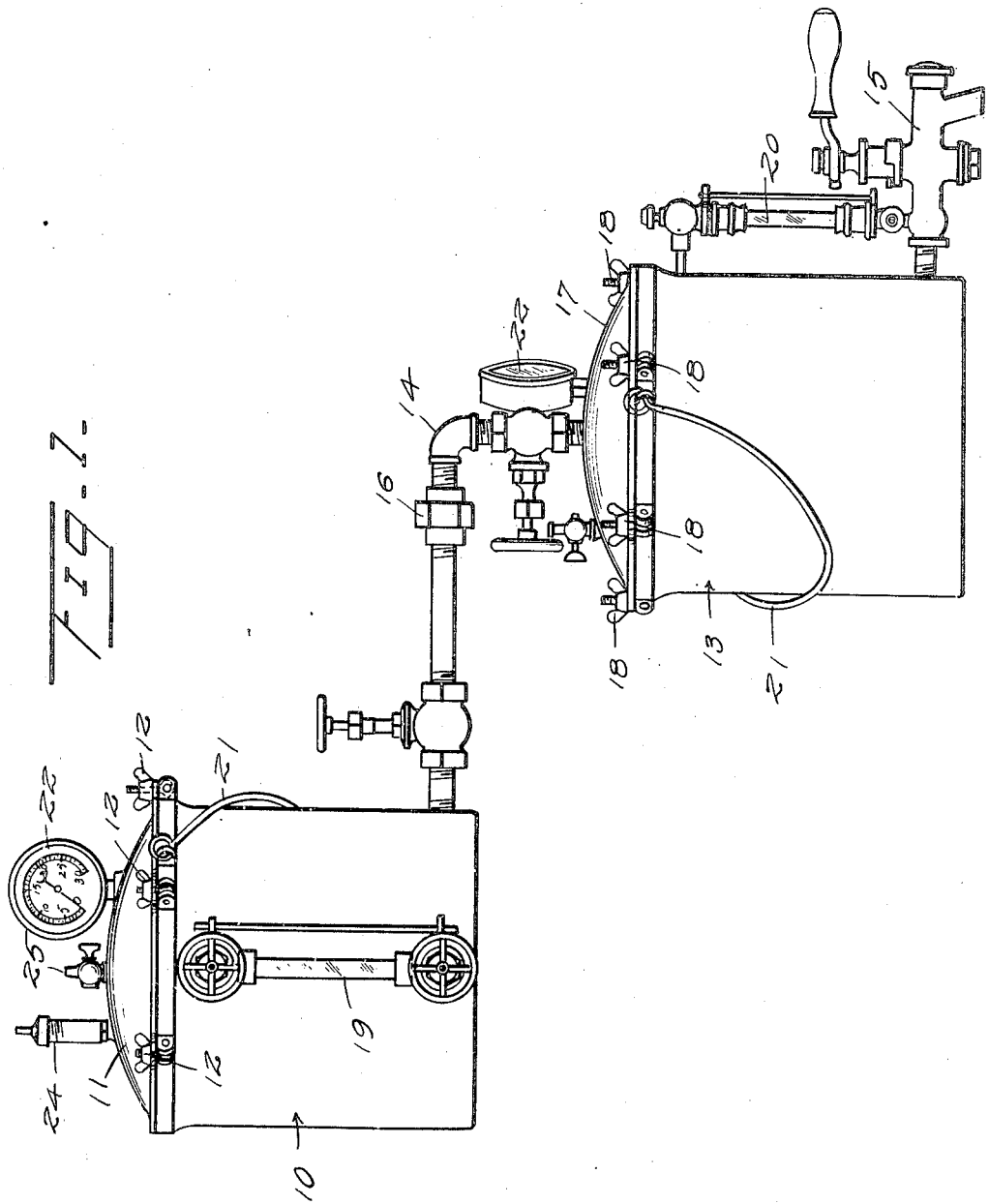
Fig. 1.
Inventor
A. S. Oldham.
Attorney

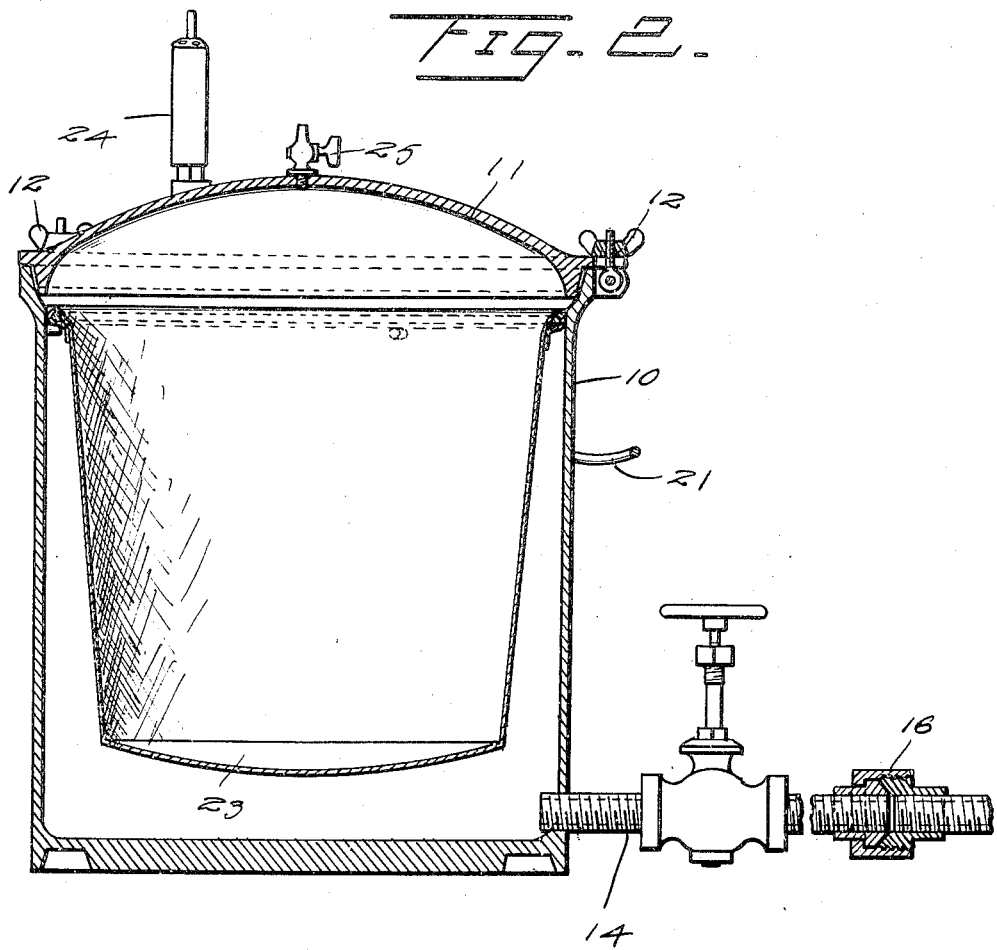

Patented Dec. 25, 1923.

1,478,908

UNITED STATES PATENT OFFICE.

ARTHUR S. OLDHAM, OF MIAMI, OKLAHOMA.

METHOD OF MAKING COFFEE.

Application filed September 7, 1922. Serial No. 586,682.

*To all whom it may concern:*

Be it known that I, ARTHUR S. OLDHAM, a citizen of the United States, residing at Miami, in the county of Ottawa and State of Oklahoma, have invented certain new and useful Improvements in a Method of Making Coffee; and I do hereby declare the following to be a full, clear, and exact description of the invention, such as will enable others skilled in the art to which it appertains to make and use the same.

The object of the invention is to provide a method of and means for making coffee as a beverage either from the whole coffee bean or the ground or pulverized bean, whereby the full strength of the bean may be extracted and utilized in the decoction, and whereby the extraction of the strength and flavor may be accomplished under such conditions as to avoid loss of aroma and avoid that rankness in the flavor which is ordinarily produced by the long exposure of the bean in its ground form to the action of the water in the presence of heat as when coffee is made according to the conventional methods.

In carrying out this object I employ an apparatus of which a typical form is illustrated in the accompanying drawings, wherein:

Figure 1 is a view of a complete apparatus including the value extracting and serving vessels.

Figure 2 is a sectional view of the value extracting or pressure vessel including the connection between the same and the serving vessel.

The apparatus embodies essentially the value extracting or cooking vessel or retort 10 having a top or cover 11 which may be secured in place by clamps 12 or the equivalent thereof and which vessel is constructed to withstand a super-atmospheric internal pressure, and a second or service vessel 13 having a receiving connection 14 with the first named vessel and a valved distributing faucet 15 whereby the liquid contents may be withdrawn from time to time for supply to the consumers. The prepared coffee does not commingle with the air as it travels from one vessel to the other and hence does not lose any of its aroma or values during such travel.

The connection 14, which is preferably in communication with the first named receptacle near its bottom and with the second named vessel at its top as shown, preferably includes a detachable union or coupling 16 to provide for the disconnection of the vessels when not in use or for cleaning purposes and the like, and the removable cover 17 of the dispensing receptacle or vessel may be secured in place by clamps 18 for a purpose similar to that described in relation to the first named vessel, both vessels being provided with water gages 19 and 20, bails or handles 21 and pressure gages 22. The primary or value extracting vessel in which is arranged a sack 23 for containing the coffee during the process of extracting the value thereof, may also be provided as illustrated with a safety valve 24 and a valved outlet or vent 25 by means of which the pressure in the vessel may be relieved when desired.

The coffee either in the whole bean or ground form having been placed in the sack in the primary or value extracting vessel 10 with a definite quantity of water, the coffee and water being combined in a definite proportion as for example, five ounces of the former to the gallon of the latter, the cover cover of the vessel is tightly secured in place to prevent loss of pressure and heat is applied to raise the temperature of the liquid contents of the vessel and at the same time the pressure to a super-atmospheric degree, as for example until the pressure gage indicates 15 pounds or the equivalent of two atmospheres. In this condition the contents of the vessel are maintained for a period of from fifteen to twenty minutes, after which the liquid is transferred from the primary vessel to the secondary or dispensing vessel 13 through the proper manipulation of the valves in the connection between said vessels, and in the dispensing vessel the liquid may be again exposed to a sufficient heat to maintain it at the proper temperature until served. The primary or value extracting vessel may then be disconnected from the dispensing vessel and recharged for a further extraction of values from a new charge of coffee to be again deposited in the dispensing vessel, so that, when for example the apparatus is used in a hotel or restaurant, the dispensing vessel may be continuously supplied with freshly prepared coffee for service to the consumers or customers.

It has been found in practice that the method herein-described, due to the combination of heat and pressure, results in the complete extraction of beverage values from the coffee whether subjected to the process in full bean or in the ground or pulverized form without deterioration by any flavor of rankness incident to the woody fibre of the bean, and at the same time the attractive aroma of the coffee is preserved and retained in the beverage from which escape has been prevented by the pressure-tight condition of the value extracting vessel.

What is claimed is:

The method of preparing coffee consisting in subjecting a quantity of coffee and water to heat and super-atmospheric pressure, and in removing the resultant beverage without contact with the air to an air tight receptacle from which it is adapted to be dispensed.

In testimony whereof I affix my signature in presence of two witnesses.

ARTHUR S. OLDHAM.

Witnesses:
BESS M. LUNDY,
MARGARET HAINE.